(12) United States Patent
Montoya et al.

(10) Patent No.: US 12,429,206 B2
(45) Date of Patent: Sep. 30, 2025

(54) THERMAL ELEMENT FOR A PRESSING INSERTION MANUFACTURING PROCESS

(71) Applicant: SIGNIFY HOLDING B.V., Eindhoven (NL)

(72) Inventors: Juan Manuel Gil Montoya, Valle de Acacias (MX); Carlton Bruce Plunk, Saltillo, MS (US); Genaro Manrique Rodriguez Perez, Monterey (MX)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/278,601

(22) PCT Filed: Mar. 18, 2022

(86) PCT No.: PCT/EP2022/057130
§ 371 (c)(1),
(2) Date: Aug. 23, 2023

(87) PCT Pub. No.: WO2022/200204
PCT Pub. Date: Sep. 29, 2022

(65) Prior Publication Data
US 2024/0200764 A1 Jun. 20, 2024

Related U.S. Application Data

(60) Provisional application No. 63/164,646, filed on Mar. 23, 2021.

(30) Foreign Application Priority Data

Mar. 30, 2021 (EP) .................................... 21166077

(51) Int. Cl.
*F21V 29/507* (2015.01)
*B23P 11/02* (2006.01)
*F21V 29/70* (2015.01)

(52) U.S. Cl.
CPC ............. *F21V 29/507* (2015.01); *B23P 11/02* (2013.01); *F21V 29/70* (2015.01)

(58) Field of Classification Search
CPC .......... F21V 29/76; F21V 29/87; F21V 29/89; F21V 15/01; F21V 15/012; F21V 17/10;
(Continued)

(56) References Cited

U.S. PATENT DOCUMENTS 8,297,782 B2    10/2012  Bafetti et al.
8,330,387 B2 *  12/2012  York ................... F21V 23/0457
                                                      315/308
(Continued)

FOREIGN PATENT DOCUMENTS

CN    201374891 Y       12/2009
CN    202082835 U  *    12/2011
(Continued)

*Primary Examiner* — Christopher E Dunay

(57) ABSTRACT

A method for coupling a thermal plate (10) and a housing (20) is disclosed. The method includes the steps of inserting the thermal plate (10) having a main area (14) and one or more folded panels (11) configured at an angle (15) from the main area (14) to allow the thermal plate (10) to be inserted within the housing (20) and stopping the thermal plate (10) within the housing (20) at a predetermined location using a stop support (101). The one or more folded panels (11) are flattened using a pressing element (100) so that the angle from the main area (14) is substantially zero degrees so that the thermal plate (10) is physically and thermally coupled to an inside wall of the housing (20). The thermal plate (10) within the housing (20) may be aligned using one or more groves (12) and grove guides (21). The coupled thermal plate (11) and the housing may form part of a luminaire (200).

15 Claims, 4 Drawing Sheets

(58) Field of Classification Search
CPC ...... F21V 17/16; F21V 17/162; F21V 17/164;
F21V 17/166; F21V 17/168; F21V 29/50;
F21V 29/502; F21V 29/507; F21V 29/85;
F21V 29/70; F21V 17/104; F21V 29/713;
F21V 17/101; F21Y 2105/16; F21Y
2115/10; B23P 11/02; B23P 11/00; F16B
4/006
See application file for complete search history.

(56) References Cited

U.S. PATENT DOCUMENTS

| | | | | |
|---|---|---|---|---|
| 9,249,966 | B1* | 2/2016 | Hooi | F21V 29/503 |
| 2011/0013383 | A1* | 1/2011 | Medinis | F21V 29/67 |
| | | | | 362/373 |
| 2011/0051430 | A1* | 3/2011 | Chen | F21V 29/71 |
| | | | | 362/373 |
| 2014/0226332 | A1* | 8/2014 | Chen | F21V 29/83 |
| | | | | 362/249.02 |
| 2020/0072453 | A1* | 3/2020 | Mittal | F21V 19/003 |
| 2022/0018522 | A1* | 1/2022 | Kopitzke | F21S 8/04 |

FOREIGN PATENT DOCUMENTS

| | | | |
|---|---|---|---|
| GB | 846830 A | 8/1960 | |
| WO | 2013108236 A1 | 7/2013 | |
| WO | WO-2018091283 A1 * | 5/2018 | ............... F21K 9/90 |
| WO | 2019237064 A1 | 12/2019 | |

* cited by examiner

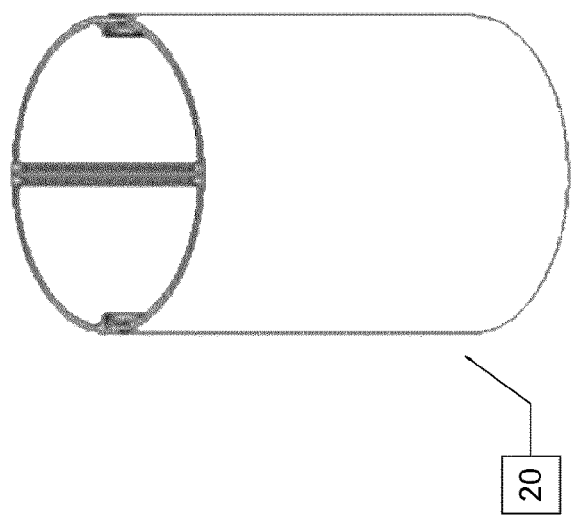
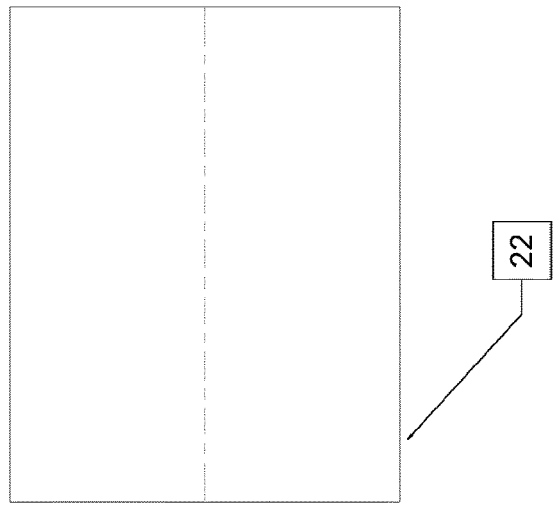
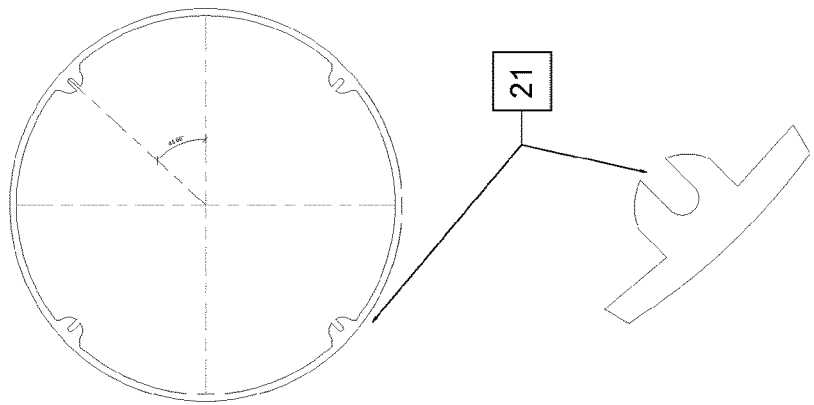
Fig. 2

THERMAL ELEMENT FOR A PRESSING INSERTION MANUFACTURING PROCESS

CROSS-REFERENCE TO PRIOR APPLICATIONS

This application is the U.S. National Phase application under 35 U.S.C. § 371 of International Application No. PCT/EP2022/057130, filed on Mar. 18, 2022, which claims the benefit of European Patent Application No. 21166077.4, filed on Mar. 30, 2021, and U.S. Provisional Application Ser. No. 63/164,646, filed on Mar. 23, 2021. These applications are hereby incorporated by reference herein.

FIELD OF THE INVENTION

The invention relates to methods for inserting a thermal element into a body of a device, more particularly, to a thermal element with pre-folded petals that can be inserted into the body of a device and then unfolded to create a solid joint of friction and a low resistance heat path to the external faces of the device.

BACKGROUND

Heat sinks are often needed for electronic and/or mechanical devices. A heat sink is a passive heat exchanger that transfers the heat generated by the electronic or the mechanical device to allow the heat to be dissipated away from the device. This helps regulate the device's temperature. Depending on the needed shape and/or material, the heat sinks can be made by many manufacturing methods. Conventional methods include extrusion and casting. Extrusion can be used to form objects which have a fixed cross-sectional area. For making the object, the raw material is pushed into a die to provide it with the desired shape such as for a heat sink. Casting is a manufacturing process in which a liquid material is usually poured into a mold, which contains a hollow cavity of the desired shape, and then allowed to solidify.

As an example of the many electronic and/or mechanical devices that benefit from or require a heat sink are lighting fixtures or luminaires. The luminaires generally include a light source, optics, control/driver circuitry, a heat sink to help dissipate the heat generated by the light source, and a housing.

It will be understood that luminaires come in many shapes and sizes that may be used for commercial and residential applications. One popular shape for luminaires is a cylinder shape (sometimes referred to as recessed lighting or high hats) that can be mounted within, or above, a ceiling to provide a flush look with the ceiling. Such cylinder-shaped luminaires include a plate or section to mount various elements/components (e.g., LEDs and optics) that need to be perpendicular to the cylinder direction. Conventional plates are part of the same body of the cylinder and are manufactured by casting or impact extrusion. Conventional plates may also be inserted with pressure with an interference tolerance that holds it in place. Such conventional plates not only support the various elements/components, the plates' other function is to conduct heat to external faces of the cylinder to dissipate heat to the outside and away from heat sensitive components such as control boards. Machining of the interfacing surfaces is required for creating the pressure fit when using extruded/machined parts. Machining is a process in which a piece of raw material is cut into a desired final shape and size by a controlled material-removal process.

There are two main shortcomings with the conventional methods for fabricating heat sinks discussed above: (1) the impact extrusion process can be difficult and expensive and (2) the conventional pressure fit plates can be difficult to fabricate because of the tolerances and machining required.

This document describes systems and methods that are intended to address at least some issues discussed above and/or other issues as discussed below.

SUMMARY OF THE INVENTION

Aspects and embodiments of the present invention address one and/or both of the shortcomings noted above.

One aspect of the present invention is related to an improved method to ease the manufacturing process of the thermal elements by avoiding the conventional impact extrusion process and the conventional pressure fit process. In this regard, aspects of the present invention provide an alternative process for the production of a lighting device element comprising two parts, such as a housing and a part at least partly integrated in the housing, especially a heat sink.

Other aspects of the present invention include fabricating a thermal element with pre-folded petals that can be inserted into the body of a device and then unfolded to create a solid joint of friction and a low resistance heat path to the external faces of the device. In this regard, aspects of the present invention are based on a housing of tubular or other shape, a support or thermal panel (that may e.g. function as a heat-spreader) with typically a similar dimension compared to the inner dimension of the housing.

One embodiment of the present invention is for instance based on a housing of tubular or other shape, and a support with folded panels (e.g., which function as a heat-spreader) with a similar dimension compared to the inner dimension of the housing. Applying local pressure on the support push the folded panels of the support outwards, whereby the support is fastened to the housing.

One embodiment of the present invention is directed to an extruded cylinder and a plate with the folded side panels. The plate may be inserted inside the cylinder and located with the help of a fixture that will also serve as mass when a press is activated to form the plate to the installed position and "wedging" it securely to a pre-determined position within the cylinder.

Another embodiment of the present invention is directed to a method for coupling a thermal plate and a housing. The method includes the steps of inserting the thermal plate having a main area and one or more folded panels configured at an angle from the main area to allow the thermal plate to be inserted within the housing and stopping the thermal plate within the housing at a predetermined location using a stop support. The concave (or convex, not shown) curvature of the main area and the one or more folded panels are flattened using a pressing element so that concave (or convex) curvature of the main area is substantially removed and the angle from the main area is substantially zero degrees so that the thermal plate is physically and thermally coupled to an inside wall of the housing. The thermal plate within the housing (20) may be aligned using one or more groves and grove guides. The coupled thermal plate and the housing may form part of a luminaire.

Yet another embodiment of the present invention is directed to a luminaire including a housing and a thermal element. The thermal element includes a main area and one or more folded panels configured at an angle from the main area to allow the thermal element to be inserted within the housing. The one or more folded panels can be flattened so that the angle from the main area is substantially zero degrees so that the thermal element is physically and thermally coupled to an inside wall of the housing. The housing (20) may also include a plurality of grove guides and the thermal element may include a plurality of groves arranged to be aligned with the grove guides.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1 schematically shows a thermal element with folded panels according to one embodiment of the present invention, FIG. 2 schematically shows a cylindrical body for receiving the thermal element of FIG. 1 according to another embodiment of the present invention.

DETAILED DESCRIPTION OF PREFERRED EMBODIMENTS

Figure 1:
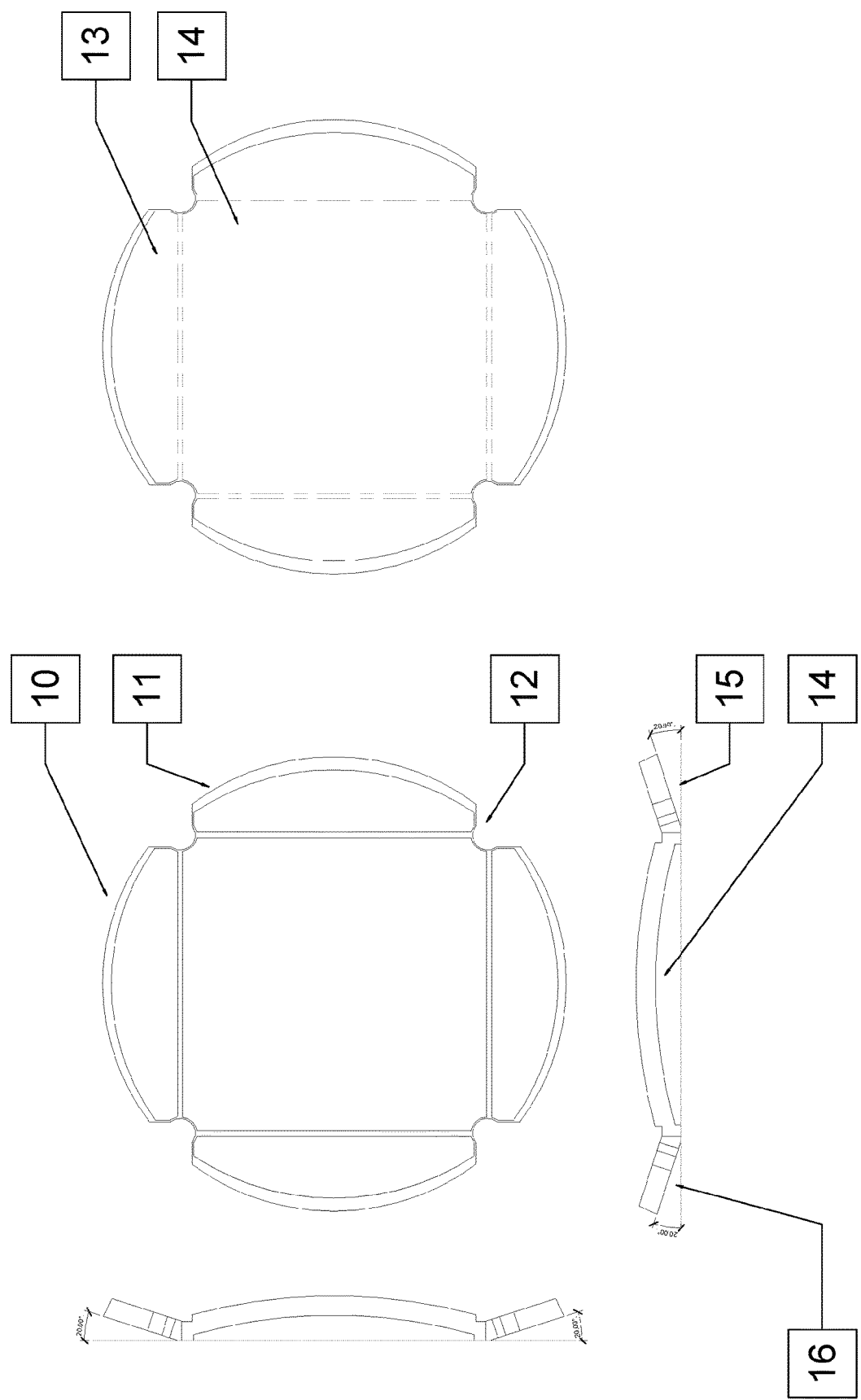

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

The term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" or "lighting device" or "luminaire" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The terms "controller" or "module" are used herein generally to describe a structure or circuitry that can be implemented in numerous ways (e.g., such as with dedicated hardware and/or software) to perform various functions discussed herein. A "processor" is one example of a controller (or a central component of a controller) which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

Further, the invention is not limited to the embodiments, and the invention lies in each and every novel feature or combination of features described herein or recited in mutually different dependent claims.

FIG. 1 shows an example of a deformable thermal plate (or thermal element) 10 with a plurality of folded panels 11. In one aspect, the folded panels 11 may be considered similar to folded petals of a flower. The folded panels 11 provide clearance during installation and allow the thermal plate 11 to be inserted inside a housing 20 (shown in FIG. 2). If the thermal plate 10 is held horizontal as shown in 16, an angle 15 of the folded panels 11 is formed from a main portion 14 of the thermal panel 11. The angle 15 preferable should be in the range of 10 to 30 degrees. However, angles larger than 1 and less than 90 degrees are also possible. As shown in the embodiment of FIG. 1, four folded panels 11 are provided. However, it should be understood that a different number of the folded panels 11 depending on the application and shape of the thermal plate 10 may be used.

Each folded panel 11 will form a sub-portion area 13 and leaving the main portion area 14 of the thermal plate 10. The sub-portion area 13 of each folded panel 11 do not need be equal and the exact amount of sub-portion area 13 again will vary depending on the application and shape of the thermal plate 10. The main requirement is that the folded panels 11 should provide enough clearance to allow the thermal plate 10 to be inserted within the housing 20. As shown in 16, the main portion area 14 may also have a concave curvature. This may help facilitate locking of the thermal plate 10 inside the housing 20.

The thermal plate 10 may also have one or more groves 12. The groves 12 may be used to provide alignment, support and/or a stop during installation of the thermal plate 11 inside the housing 20.

The thermal plate 10 may be made, for example, from an aluminum sheet metal plate. Suitable materials for the thermal plate 10 include one or more of aluminum alloys 1051, 6061, 6063, copper, copper-tungsten, magnesium, silver and combinations of two or more of the afore mentioned. However, other thermal conductive materials may also be applied. The housing 20 may comprise the same material. The term "thermally conductive" refers to a material having a thermal conductivity of at least 5 W/(m K), such as at least 10 W/(m K), especially at least 100 W/(m K). Examples of suitable materials include steel, aluminum, copper, AlN, BN, SiC, and AL6061.

FIG. 2 shows an example of the housing 20 (3D and cross-section). In this embodiment, the housing 20 is cylindrical. The housing 20 may be fabricated using a conventional extrusion process (sheet 22 is extruded to form the housing 20). It should be understood that other geometric shapes can also be extruded with the extrusion process or other manufacturing method. The shape of the housing 20, either pipe-like or rod-like, may be any shape that is used in the art. For example, the housing 20 may also comprise a circular, rectangular, pentagonal, hexagonal, elliptical, or octagonal cross-section, or other cross-section. Hence, in various embodiments, the housing 20 has a cross-section selected from the group consisting of circular, elliptical, triangular, square, rectangular, pentagonal, hexagonal, and octagonal. In a preferred embodiment, the housing 20 comprises a circular tube. The symmetries listed here may apply to the shape of thermal plate 10 to correspond to the housing 20 as needed. It is also noted that the external shape of the housing 20 may differ from the internal shape. For instance, a pipe-like shaped element may have a cross-section that is square for the external shape but is circular for the internal shape of the pipe-like shaped element: i.e. a tube like element with a square outer shape. Further, the dimensions of the cross-section may vary over the length of the housing 20, like a conical shape or a pyramid-like shape. The housing 20 may consist all, or in part, of one or more thermally conductive materials discussed above.

The housing 20 may also include one or more grove guides 21. The grove guides 21 are used in conjunction with the groves 12 to help align, guide, support and/or stop the thermal plate 10 at a certain position within the housing 20.

As shown in FIGS. 1 and 2, the grove 12 and the grove guides 21 have a circular shape. However, the grove 12 and grove guide 21 may substantially have any matching shape. For instance, the grove 12 and grove guide 21 may have a cross-section selected from the group consisting of circular, elliptical, triangular, square, rectangular, pentagonal, hexagonal, and octagonal, respectively. The grove guide 21 may be have a stop section that has a larger cross-section to ensure that the thermal plate 10 is held/stops during the insertion process at a predetermined location within the housing 20.

Next, the insertion and pressing process will be described generally then in more detail. The thermal plate 10 is inserted within the housing 20 and stopped at a defined point. The exact location the thermal plate 10 is stopped will depending on the application and housing requirements. When stopped at the defined point, a press comes from an open side of the housing 20 and forces the thermal plate 10 with the folded panels 11 against the housing 20 flattening the thermal plate 10. In the pressing process, the thermal plate 10 recovers its original unfolded size and creates an interference with the housing 20, resulting in the fixation of the thermal plate 10 within the housing 20 and also creating a thermal coupling between the thermal plate 10 and the housing 20.

The pressing process causes at least part of the thermal plate 10 to be attached and thermally coupled to the housing 20. The technology of pressing may be comparable to the pressing technology applied in pressing of a coin, especially comprising a center and a periphery. However, pressing as described herein especially fastens material to the housing 20 by flatting the folds of the folded panels 11 in a radial direction towards the inner wall(s) of the housing 20. The groves 12 and the grove guides 21 may be used to substantially prevent translational or rotational movement of the thermal plate.

In various embodiments, the term "pressing" refers to applying local pressure on the surface of the thermal panel 10 and flatting the folding panels 10, and if applicable, the concave curvature of the main portion area 14. When applying an asymmetric shape of the geometry of a pressing element, one can manipulate in what direction the material is pushed. Pressure can be applied in a point, partial trajectory, a line fully around the periphery, or entire surface area of the thermal plate 10. In a preferred embodiment, the pressure is applied evenly on the thermal panel 10 to flatten the folded panels 11 in an outward direction relative to a central axis of a pressing element.

Figure 3:
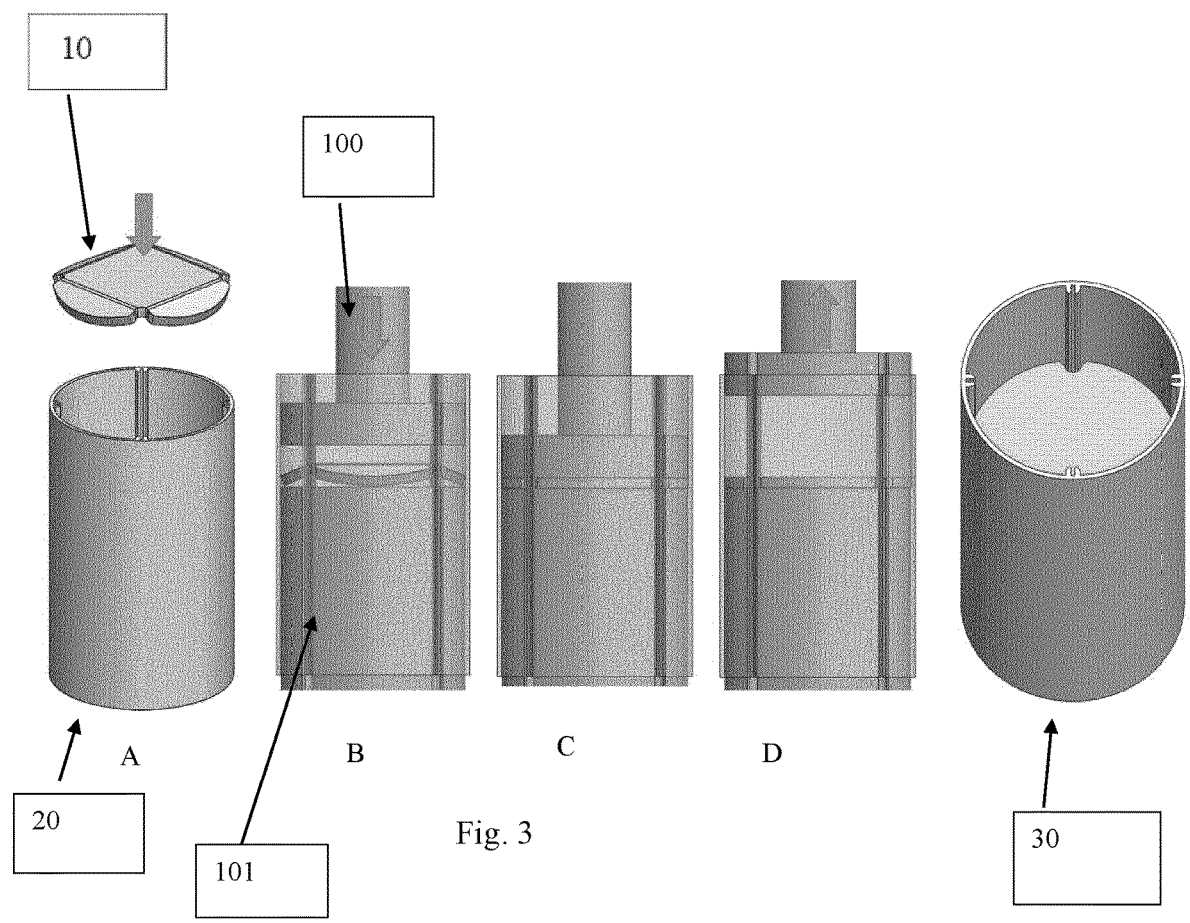
FIG. 3 shows a method of assembling the thermal element of FIG. 1 and the cylindrical body of FIG. 2.

For clarity reasons, FIG. 3 depicts the concepts of an embodiment of the method for producing a cylindrical housing 20 including the thermal panel 10. In step A, the thermal plate 10 is inserted into the cylindrical housing 20. The insertion may be done manually or by an automated robotic mechanism. If the groves 12 and the grove guides 21 are provided, the thermal plate 10 is aligned in the cylindrical housing 20 using the groves 12 and grove guides 21. In step B, a pressing element 100 and stop support 101 are arranged in the cylindrical housing 20. The stop support 101 is used to locate the thermal plate 10 in a predetermined position within the housing 20. As noted above, the grove guides 21 may also be used as the stop support. The predetermined position may vary depending on the shape and intended use of the housing 20. One of ordinary skill will appreciate that other arrangement/configurations of the pressing element 100 and stop support 101 may also be used. For example, two pressing elements 100 may be used instead of the stop support 101. The shape of the pressing element 100 and stop support 101 may also vary depending on the shape of the thermal plate 10 and the housing 20. At the next step (step C), the thermal plate 10 is pressed using a pressing element 100. This pressing process flattens the folded panels 11 and locks the thermal panel 10 in place within the housing 20. The pressing process flattens the concave curvature of the main area and the folded panels 11 so that the final angle 15 is substantially zero degrees relative to the plate 10 and the concave curvature is substantially removed from the main area 14. In step D, the pressing element 100 is removed. The final configuration 30 shows the thermal plate 10 within the housing 20 so that the thermal plate 10 is physically and thermally coupled to the housing 20. It has been found that by pressing the thermal plate 10 into the housing 20 in this manner creates a strong thermal connection so that the thermal contact resistance is low between the thermal plate 10 and the housing. In addition, choosing materials for the thermal plate 10 and the housing 20 that are the same or similar in composition will also help reduce the thermal contact resistance.

Figure 4:
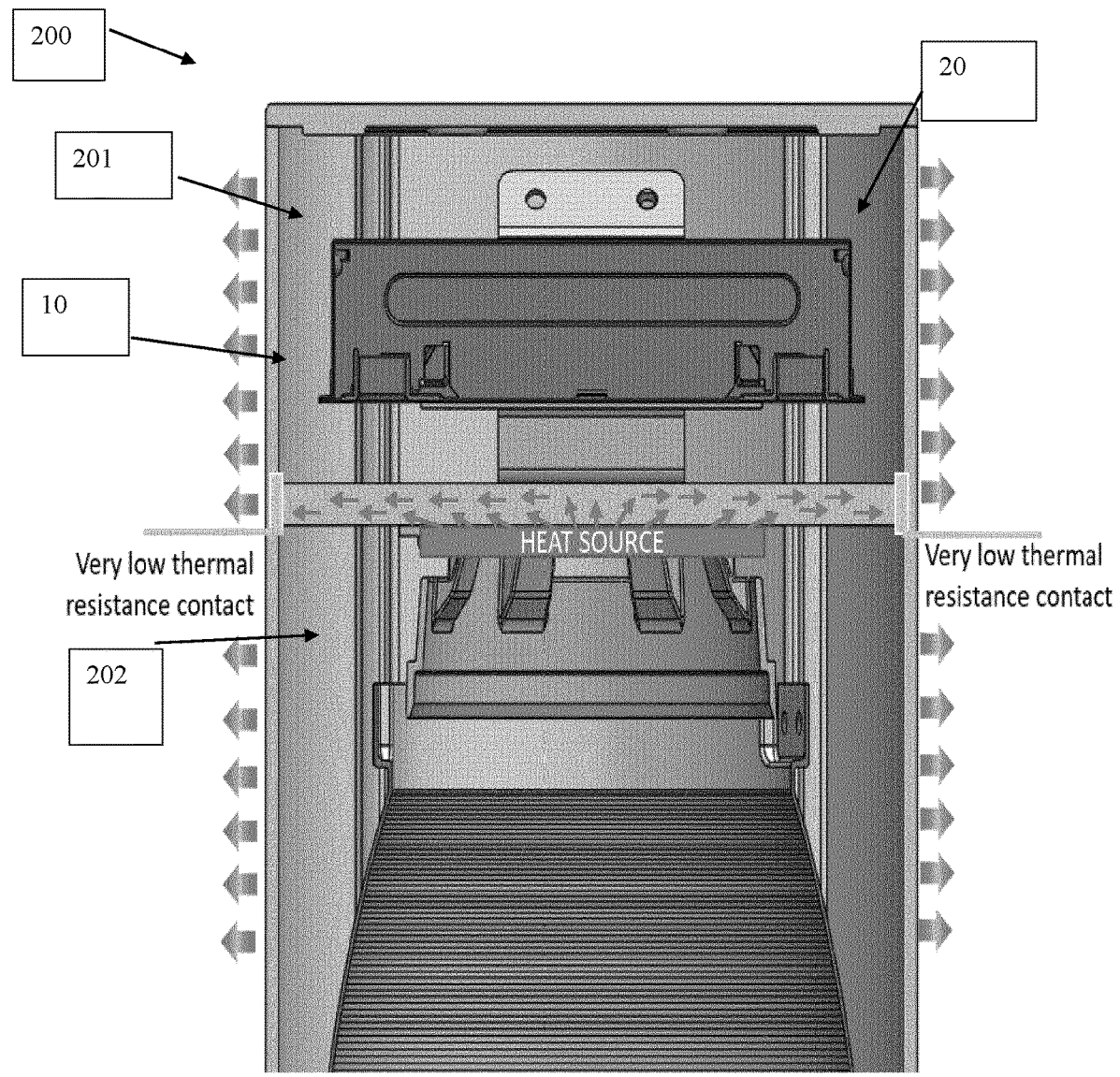
FIG. 4 shows a luminaire including a thermal element according to various aspects of the present invention.

FIG. 4 shows a luminaire 200 including the thermal plate 10 according to various aspects of the present invention. The thermal plate 10 is physically and thermally coupled to the housing 20. The luminaire 200 includes a controller or light driver unit 201 mounted on or above the thermal plate 10 and a light source 202, mounted below the thermal plate 10, that generates heat that is at least in part dissipated via the thermal plate 10 and the housing 20.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, the housing 20) is not limited to a structure for luminaires.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A): in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A): in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In the claims references in parentheses refer to reference signs in drawings of exemplifying embodiments or to formulas of embodiments, thus increasing the intelligibility of the claim. These references shall not be construed as limiting the claim.

The invention claimed is:

1. A device, comprising:
   a housing; and
   a thermal element including a main area having a curvature and one or more foldable panels that can be configured at an angle from the main area, wherein the foldable panels are configured to provide clearance to be inserted inside of the housing, only when folded,
   wherein the curvature and the one or more folded panels can be flattened, wherein the curvature is substantially removed from the main area and wherein panels are unfolded, so that the thermal element is physically and thermally coupled to an inside wall of the housing, wherein the unfolded panels create an interference with the inside wall of the housing.

2. The device of claim 1, wherein the housing includes including a plurality of grove guides and the thermal element includes a plurality of groves arranged to be aligned with the grove guides.

3. The device of claim 2, wherein the plurality groves and the plurality of grove guides have a cross-section selected from the group consisting of circular, elliptical, triangular, square, rectangular, pentagonal, hexagonal, or octagonal.

4. The device of claim 1, wherein the thermal element is fabricated from an aluminum alloy.

5. The device of claim 1, wherein the thermal element is fabricated from a material having a thermal conductivity of at least 5 W/(m K).

6. The device of claim 1, wherein the thermal element is circular in shape, the housing is cylindrical in shape and the thermal element includes four folded panels each having a sub-portion area of the thermal element that are substantially equal.

7. The device of claim 1, wherein the device forms at least part of a housing for a luminaire.

8. The device of claim 1, wherein the luminaire includes a light source that generates heat that is at least partially dissipated via the thermal element and the housing.

9. The device of claim 1, wherein housing has a cross-section selected from the group consisting of circular, elliptical, triangular, or square.

10. The device of claim 9, wherein the thermal element has an outer-surface shape to match the inner-surface of the housing in a cross-section perpendicular to an axial direction of the housing.

11. A method for coupling a thermal plate to a housing comprising the steps of:
    inserting the thermal plate having a main area having a curvature and one or more folded panels configured at an angle from the main area to allow the thermal plate to be inserted within the housing;
    stopping the thermal plate within the housing at a predetermined location using a stop support; and
    flatting the curvature of the main area and the one or more folded panels using a pressing element, wherein the curvature is substantially removed from the main area and the angle from the main area is substantially zero degrees so that the thermal plate is physically and thermally coupled to an inside wall of the housing.

12. The method of claim 11 further comprising the step of aligning the thermal plate within the housing using one or more groves and grove guides.

13. The method of claim 11, wherein the thermal plate and the housing form part of a luminaire.

14. The method of claim 11, wherein the predetermined location is adjustable.

15. The method of claim 11, wherein the angle is between 10 and 30 degrees.

* * * * *